United States Patent
Wegman

(10) Patent No.: US 7,621,502 B2
(45) Date of Patent: Nov. 24, 2009

(54) MINIMAL-COMPRESSION BUTTERFLY VALVE

(75) Inventor: Paul M. Wegman, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 293 days.

(21) Appl. No.: 11/639,522

(22) Filed: Dec. 15, 2006

(65) Prior Publication Data

US 2008/0142751 A1    Jun. 19, 2008

(51) Int. Cl.
*F16K 1/226* (2006.01)

(52) U.S. Cl. .................. 251/306; 251/175; 251/304; 251/305

(58) Field of Classification Search .......... 251/286, 251/314, 175; 137/234.5, 246.22, 248; 399/92
See application file for complete search history.

(56) References Cited

U.S. PATENT DOCUMENTS

| | | | | |
|---|---|---|---|---|
| 3,638,674 A | * | 2/1972 | Forst et al. | 251/173 |
| 4,134,535 A | * | 1/1979 | Barthels et al. | 383/102 |
| 4,266,753 A | * | 5/1981 | Okada | 251/305 |
| 4,815,704 A | * | 3/1989 | Berchem | 251/315.04 |
| 5,217,041 A | * | 6/1993 | Houston | 137/240 |
| 5,227,460 A | | 7/1993 | Mahabadi et al. | |
| 5,327,928 A | * | 7/1994 | Thomason | 137/246.22 |
| 5,799,227 A | * | 8/1998 | Matheis et al. | 399/92 |
| 7,004,210 B1 | | 2/2006 | Wegman et al. | |

* cited by examiner

*Primary Examiner*—John Rivell
*Assistant Examiner*—Jeremy S Baskin
(74) *Attorney, Agent, or Firm*—Lloyd F. Bean, II

(57) ABSTRACT

A butterfly-type valve for controlling toner material flow to a toner container, including, a valve plate which is pivotally disposed in an elongate flow path defined by a passage way, wherein the valve plate is pivotal from a closed position which substantially closes a fluid communication along the path to an open position which maximally permitting fluid communication along the path, a gap area defined between the valve plate and the passage way when the valve plate is in the closed position which allows minimum toner material flow therethrough without compressing the toner material, and a pump for supplying air to the gap area when the valve plate is in the closed position to stop the minimum toner material flow.

10 Claims, 4 Drawing Sheets

MINIMAL-COMPRESSION BUTTERFLY VALVE

BACKGROUND AND SUMMARY

This invention relates generally to filling a container with material, and more particularly concerns a butterfly valve for controlling the flow of powders such as toner from a fill tube to a toner container.

Currently when filling powders, for example, toners into toner containers, toner is transported from the toner supply hopper into the container by a rotating auger. The auger is a spiral shaped mechanical part which pushes particles of toner inside a fill tube by direct mechanical contact. The speed of the toner movement in the fill tube is proportional to the speed of rotation of the auger and is limited by heat release due to auger/toner friction. High auger speed will cause the toner to melt, particularly for low melt toner such as disclosed in U.S. Pat. No. 5,227,460 to Mahabadi et al. The relevant portions thereof are incorporated herein by reference.

The problems associated with controlling the filling of toner containers are due primarily to the properties of the toner. Toner is the image-forming material in a developer which when deposited by the field of an electrostatic charge becomes the visible record. There are two different types of developing systems known as one-component and two-component systems.

In one-component developing systems, the developer material is toner made of particles of magnetic material, usually iron, embedded in a black plastic resin. The iron enables the toner to be magnetically charged. In two-component systems, the developer material is comprised of toner which consists of small polymer or resin particles and a color agent, and carrier which consists of roughly spherical particles or beads usually made of steel. An electrostatic charge between the toner and the carrier bead causes the toner to cling to the carrier in the development process. Control of the flow of these small, abrasive and easily charged particles is very difficult.

The one-component and two-component systems utilize toner that is very difficult to flow. This is particularly true of the toner used in two-component systems, but also for toner for single-component systems. The toner tends to cake and bridge within the hopper. This limits the flow of toner through the small tubes which are required for addition of the toner through the opening of the toner container. Also, this tendency to cake and bridge may cause air gaps to form in the container resulting in partial filling of the container.

In addition, during the cartridge filling process, the toner fillers need to be periodically replenished with new toner. The toner bin usually positioned above the fillers hopper and equipped with an on/off butterfly valve that opens and closes the flow. The butterfly valve consists of a flat disc, which can rotate (usually up to 90 degree) inside a short pipe serving as a valve housing. The diameter of the disc is slightly smaller then inside diameter (ID) of the housing/pipe. The disc is turned by an electrical or pneumatic actuator, located on the outer surface of the valve and connected to the disc by a short axle. During the cartridge toner filling process, the toner in the filling machine hopper is periodically (every several minutes) replenished. During the valve actuation, the valve disc moves against the seal causing the seal to compress. The seal prevents toner from bypassing the disc when it is in the closed position.

A problem with the above type butterfly valve is that the toner particles in the area between the disc and the seal are compressed/damaged when the butterfly valve switches states between the on/off position. Applicants have found that the compressed/damage toner particles lead to print defects when used in xerographic printing machines. Various attempts have been used to minimize the compression zone—inflatable-seals, smaller seals, different seal material and smaller discs but these have not been successful.

The present invention obviates the problems noted by providing minimal-compression butterfly valve that employs a novel seal and disc arrangement that creates an effective sealing-effect without creating the deleterious toner compression-zone.

In an embodiment of the present disclosure there is provided a butterfly-type valve for controlling toner material flow to a toner container, comprising a valve plate which is pivotally disposed in an elongate flow path defined by a passage way, wherein the valve plate is pivotal from a closed position which substantially closes a fluid communication along the path to an open position which maximally permitting fluid communication along the path, a gap area defined between said valve plate and said passage way when said valve plate is in said closed position which allows minimum toner material flow there through without compressing the toner material, and a pump for supplying vacuum to said gap area when said valve plate is in said closed position to stop said minimum toner material flow.

BRIEF DESCRIPTION OF THE DRAWINGS

Other features of the present invention will become apparent as the following description proceeds and upon reference to the drawings, in which.

DETAILED DESCRIPTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
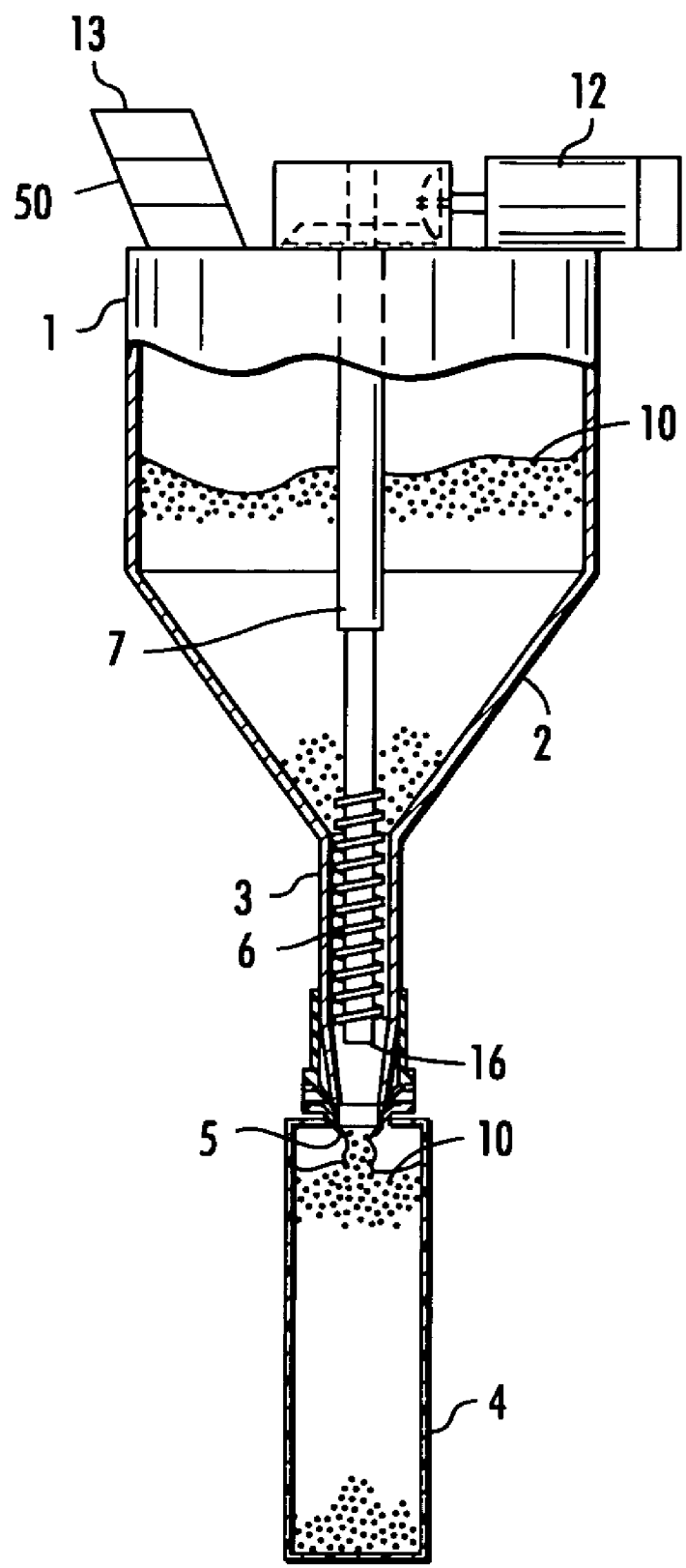
FIG. 1 illustrates the apparatus embodiment of the disclosed system for filling a canister with the toner during the filling operation.
Figure 2:
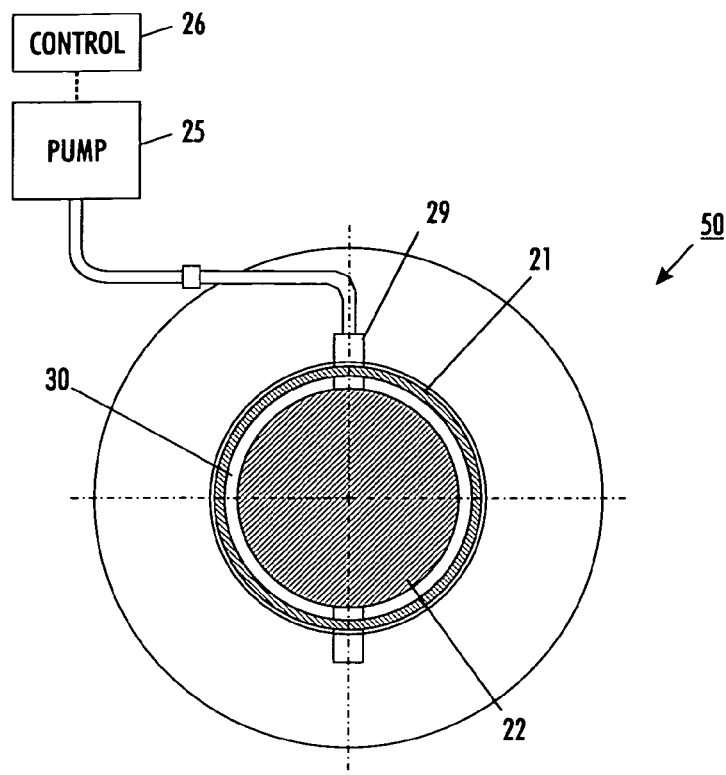
FIG. 2 illustrates a top view of the butterfly valve of the present disclosure.

For a general understanding of the features of the present invention, reference is made to the drawings. In the drawings, like reference numerals have been used throughout to identify identical elements. FIG. 1 schematically depicts a toner cartridge filling process incorporating the features of the present invention therein. An exemplary toner cartridge filling process is described in U.S. Pat. No. 7,004,210 which is hereby incorporated by reference. It will become evident from the following discussion that the butterfly valve of the present invention may be employed in a wide variety of devices and is not specifically limited in its application to the particular embodiment depicted herein.

In FIG. 1, the system is shown during the toner (or particulate material) filling operation where a hopper 1 containing toner is provided with a bottom funnel-like section 2. The funnel 2 will have a conduit 3, which is operatively connected to a cartridge 4 via cartridge opening 5. An auger 6 is disposed through the hopper 1 and extends down to the opening 5 where it transports toner 10 from the hopper 1 to the cartridge 4 during a filling operation. Auger 6 is operatively connected to an auger device shaft 7 that supplies power and movement to the auger 6. A motor 12 may be positioned in any suitable location to provide power to the system and to auger 6 during the filling operation. The hopper 1 has a toner inlet 13 where a sufficient amount of toner 10 (or particulate material) can be supplied as needed from bin 100. Toner inlet 13 is equipped with butterfly valve 50 of the present disclosure that opens and closes the flow from bin 100 to hopper 1 which will be discussed in greater detail supra.

Now focusing on the butterfly valve of the present disclosure, as shown in FIGS. 1-5, butterfly valve 50 opens and closes to permit an appropriate amount of toner particles to go to hopper 1. The butterfly valve 50 consists of a flat disc 22, which can rotate (usually up to 90 degree) inside pipe 21 serving as a valve housing. The diameter of the disc is smaller then inside diameter (ID) of the housing/pipe. Disc 22 is turned by an electrical or pneumatic actuator (not shown), located on the outer surface of the valve and connected to the disc by a pivotal member 29. During the cartridge toner filling process, the toner in the filling machine hopper is periodically (every several minutes) replenished.

In one embodiment the butterfly valve of the present disclosure disc 22 has porous member 23 about the perimeter of thereof and rotates about pivotal member 29. Porous member 23 can be composed of a sintered material such as polyethylene made by Porex Inc.; a sintered metal such as cobalt made by Astromet Inc; or other porous materials, such as ceramic may also be suitable.

Pivotal member 29 has a port therein, in communication with porous member 23. Pump 25 delivers air to porous member 23 via the port in pivotal member 29. Controller 26 controls pump 25 operation, pump 25 can supply a vacuum (negative air flow) or positive air flow to porous member 23.

Figure 4:
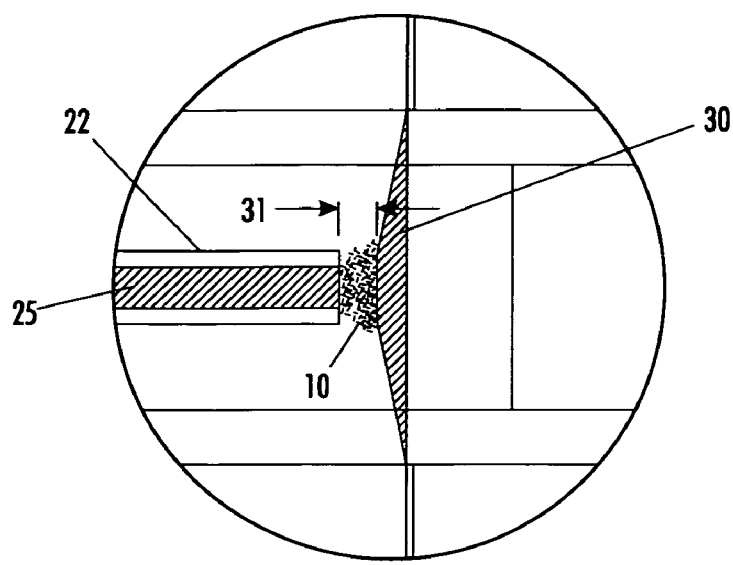
FIG. 4 illustrates a side view of the butterfly valve of the present disclosure in the closed position.
Figure 5:
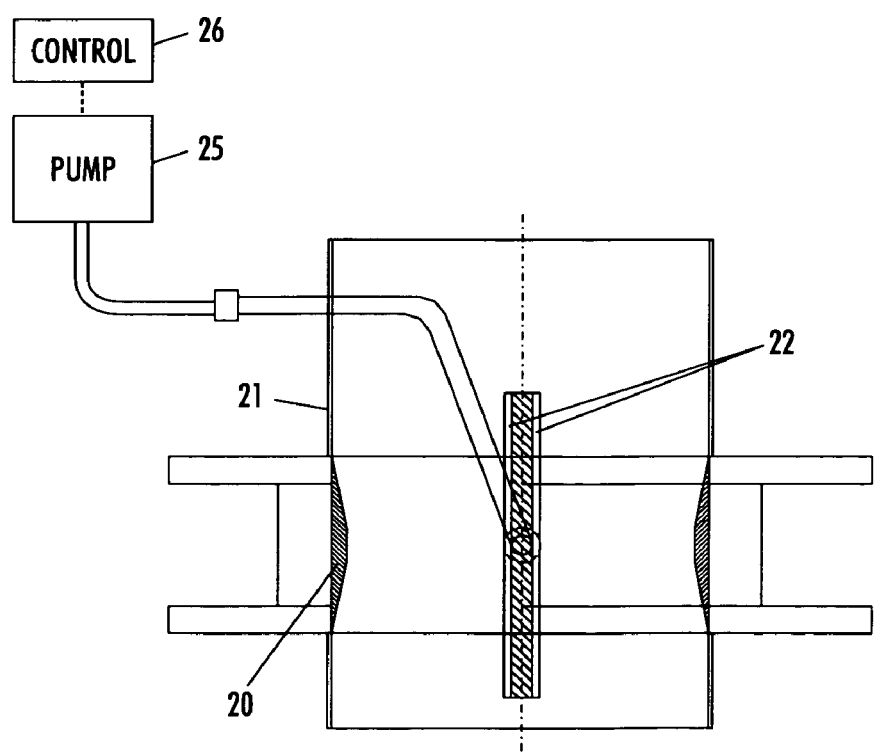
FIG. 5 illustrates the butterfly valve of the present disclosure with an expanded view of the annular gap section between the disc and the seal.

Seal 30 is attached to pipe 29 and seal 30 is sized so that there is an annular gap 31 between seal 30 and disc 22 when butterfly valve 50 is in a closed position as shown in FIGS. 4 and 5. The annular gap is sized so that toner particles can flow therethrough without being compressed. Seal 30 can be in the form of an inflatable (movable) seal or static seal.

Figure 3:
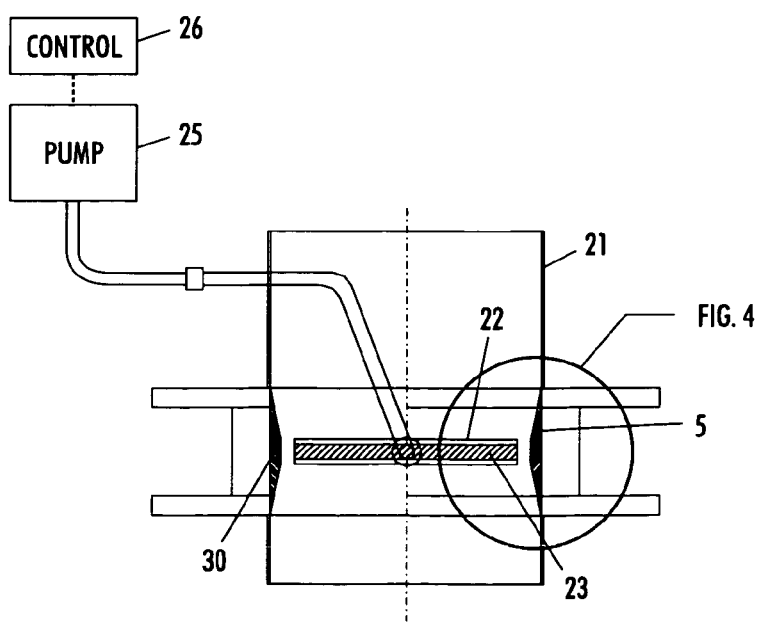
FIG. 3 illustrates a side view of the butterfly valve of the present disclosure in the open position.

During operation of butterfly valve 50, when disc 22 is closed, as shown in FIGS. 4 and 5, a vacuum is applied to porous member 23 of disc 22. The vacuum causes toner to be attracted to the annular gap 31 which effectively bridging/closing the annular gap thereby stopping all toner flow. When opening butterfly valve 50, the vacuum is turned off by controller 26 and the disc 22 is rotated to the open position as shown in FIG. 3. Positive airflow may be used, if required, to clear the disc/seal area after the vacuum is turned off. An advantageous feature of the present disclosure since there is no interference due to the annular gap, there is no compression zone for toner to become compacted.

Figure 6:
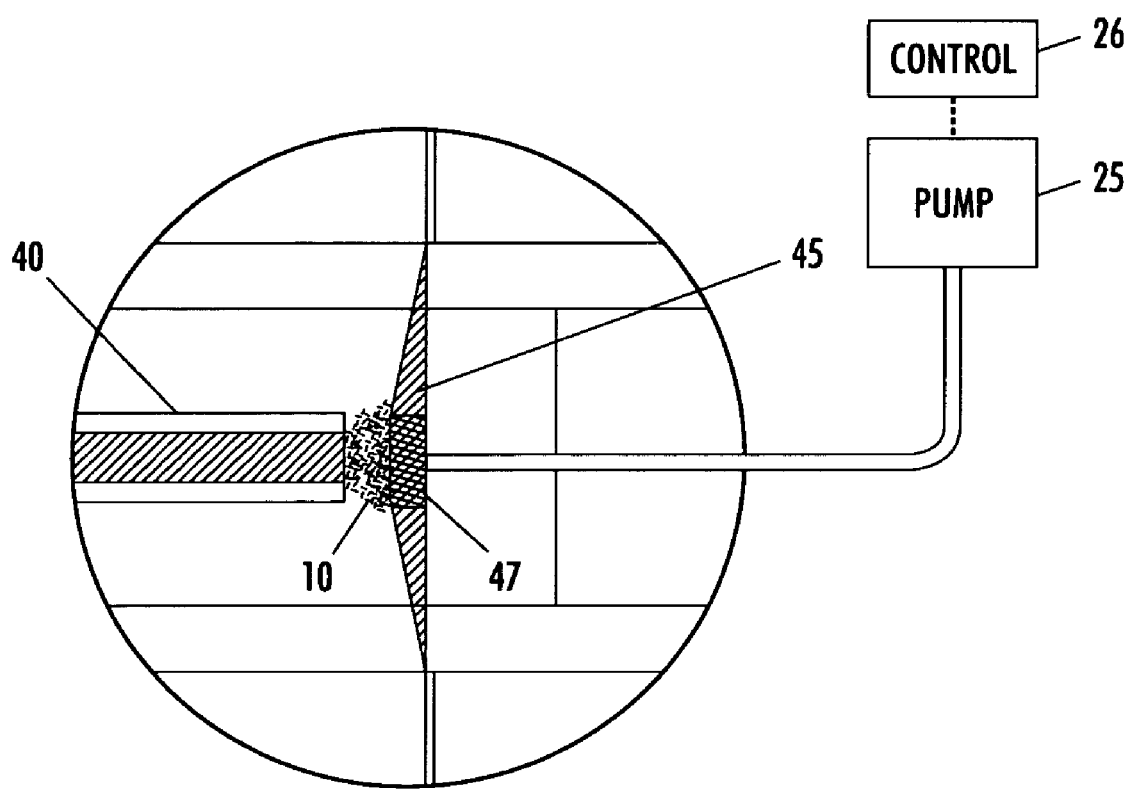
FIG. 6 illustrates an alternate embodiment of the butterfly valve of the present disclosure.

Referring now to FIG. 6, an alternate embodiment of the butterfly valve of the present disclosure, disc 40 is a conventional disc and seal 45 has a porous member 47 about the perimeter thereof. Porous member 47 is connected to Pump 25. During typical operation, when the disc is closed, a vacuum is applied to the seal. The vacuum would attract toner and effectively bridge the annular gap between the disc and the seal. For opening, the vacuum is turned off and the disc is rotated to the open position. Positive airflow may be used, if required, to clear the seal after the vacuum is turned off.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A butterfly-type valve for controlling toner material flow to a toner container, comprising:

a valve plate which is pivotally disposed in an elongate flow path defined by a passage way, wherein the valve plate is pivotal from a closed position which substantially closes a fluid communication along the path to an open position which maximally permits fluid communication along the path, said valve plate having an outer diameter substantially smaller than an inside diameter of said passage way defining a gap area surrounding the circumference of said valve plate when said valve plate is in said closed position, said gap area having a predefined spacing to allow said toner material to flow without compressing said toner material within said gap area, and a pump for supplying negative air pressure to said gap area, wherein said toner material is attracted to said gap area forming a bridge of toner material in said gap area to substantially stop toner material flow in said gap area when said valve plate is in said closed position and said pump is enabled, and wherein said valve plate includes a porous member about the perimeter of said valve plate.

2. The butterfly valve of claim 1, further comprising a seal positioned in said passage way, said seal and said valve plate forming said gap area when said valve plate is in said closed position.

3. The butterfly valve of claim 2, wherein said seal includes a porous member.

4. The butterfly valve of claim 3, wherein said pump supplies a vacuum to said porous member to attract toner material thereto to form said bridge of toner material in said gap area defined between said seal and said valve plate.

5. The butterfly valve of claim 1, wherein said pump supplies a positive air flow to said porous member to clear toner material there from.

6. The butterfly valve of claim 1, wherein said valve plate includes two plate members with said porous member there between.

7. The butterfly valve of claim 1, wherein said valve plate includes a pivotal member therein having an air port, in communication with said porous member, for delivering air to said porous member from said pump.

8. The butterfly valve of claim 1, wherein said porous member is selected from the group consisting of sintered plastic, sintered metal or sintered ceramic.

9. The butterfly valve of claim 2, wherein said seal is a static seal.

10. The butterfly valve of claim 2, wherein said seal is an expandable seal.

* * * * *